March 5, 1968  M. C. HARTNELL-BEAVIS  3,371,894
RESILIENT MOUNTING DEVICES

Filed Feb. 2, 1966  3 Sheets-Sheet 3

INVENTOR
M. C. HARTNELL-BEAVIS
BY
Holcombe, Wetherill + Brisebois
ATTORNEYS

United States Patent Office 3,371,894
Patented Mar. 5, 1968

3,371,894
RESILIENT MOUNTING DEVICES
Michael Carl Hartnell-Beavis, Drymen, Scotland, assignor to Yarrow and Company, Glasgow, Scotland, a British company
Filed Feb. 2, 1966, Ser. No. 524,419
Claims priority, application Great Britain, Feb. 9, 1965, 5,650/65
4 Claims. (Cl. 248—9)

ABSTRACT OF THE DISCLOSURE

Rotary coupling in which relative rotation between two co-axial members compresses one set of gas filled flexible tubes interposed between concave bearing surfaces on ribs projecting from the two members and allows a second such set to expand. The increase in contact area and pressure of the set of tubes compressed causes the coupling to become stiffer as the displacement from equilibrium increases. The coupling accommodates misalignment of the axes of the two members by rolling of the tubes.

---

This invention relates to resilient mounting devices. Such devices are used, for example, to mount a body on a support when the body is subjected to a periodic disturbing force and it is desired to prevent or at least diminish the transmission of the disturbing force to the support.

The invention provides a resilient mounting device which comprises a first member having a bearing surface, a second member having a bearing surface, and a gas-filled container interposed between the said two bearing surfaces, the resilience of the mounting being substantially wholly provided by the pressure of the gas in the container, and the arrangement being such that a decrease in the separation between the two members increases the areas of contact between the container and the said bearing surfaces, and an increase in the separation between the two members decreases the areas of contact between the container and the said bearing surfaces.

The stiffness of a mounting is defined as the rate of decrease of the force applied across a mounting with respect to the distance between the members separated by the mounting. The stiffness of the mounting of the invention increases with increasing compression of the mounting. The manner in which the stiffness increases can (within limits) be controlled according to the shape which is given to the bearing surfaces and the bearing surfaces may be so shaped that the rate of increase of stiffness itself increases with increasing compression of the mount.

The behaviour of a body supported on a mount varies with the frequency of the force applied to the body. When the stiffness of the mounting is constant, at frequencies very much higher than the natural frequency of the system, the amplitude on the motion of the body under a periodic disturbing force is effectively independent of the stiffness of the mount and is very small. The amplitude of the force transmitted by the mounting is then also very small, and neglecting damping, is proportional to the stiffness. However, when the force varies slowly in comparison with the natural frequency, effectively the whole of the force is transmitted by the mounting and the displacement of the body is relatively large, being inversely proportional to the stiffness.

Hence, although it is desirable to keep the stiffness of the mounting as low as possible in order to reduce the transmission of high frequency vibration, this leads to large displacements of the body under the influence of slowly varying disturbing forces. This is inconvenient in applications where it is desirable to locate the body accurately, for example when the body is a prime mover which is connected to pipes and transmission shafts whose far ends are fixed relative to the support. When the stiffness of the mounting increases with increasing compression, the transmission at high frequencies when the body occupies its normal equilibrium position is governed by the stiffness of the mounting at that position, but the inward displacement of the body under a slow increase in the force supported by the mounting is less than would be the case if the stiffness throughout the compression were the stiffness of the mounting at the equilibrium position. During this disturbance, the high frequency transmission will of course increase in accordance with the stiffness. If the stiffness increases sufficiently sharply with increasing compression, the body can be located within narrow bounds.

Preferably, the container is not attached to either of its bearing surfaces.

The wall of the container may be provided with projecting means which engage a recess in one or each of the said bearing surfaces to prevent sideways movement between the container and that bearing surface. The projecting means may comprise two ribs, one engaging a groove in one bearing surface and the other engaging a groove in the other bearing surface.

The container may form a closed vessel. Alternatively, orifice means may connect the interior of the container to the interior of a chamber, the volume of the chamber being at least a fifth of the volume the container has when not subjected to any compressive force. This provides damping which limits the magnitude of the oscillation of the body and of the transmitted force, which, when the system is in the region of its natural frequency, could otherwise become inconveniently large. At high frequencies, when the impedance of the orifice is high, the stiffness of the mounting is effectively that of the container. At very low frequencies, however, the orifice offers little resistance to flow and the effective volume in the combined volumes of the chamber and container, which results in the stiffness being decreased. In this case, it is especially useful to have a stiffness which, because of the shaping of the bearing surfaces, increases increasingly rapidly with compression, because it tends to counteract the effect of this decreased stiffness on the low-frequency characteristic of the system.

There may be provided pressure regulating means arranged to alter the mass of gas in the container in response to changes in the separation between the two members, the arrangement being such that, when the container is subjected to a slowly varying compressive force by the two members, the container tends to maintain a constant separation between the two members despite such slow variations in the compressive force.

In this case, the container and pressure regulating means may form an anti-vibrating mounting as claimed in claim 1 of our British patent specification No. 27,827/63, the container referred to herein being the variable-volume gas-filled vessel referred to in claim 1 of that specification.

Preferably the pressure of the fluid in the mounting is greater than 150 pounds per square inch gauge.

The portion of the container which is in contact with the bearing surfaces may be tubular when not subject to any compressive force. The tubular portion can then be of considerable length in comparison to its width, so that the mounting provides support along an effectively linear region. The body to be supported may then be supported by one or more such mountings arranged around the periphery of the body, and the or each mounting device may be so arranged that the force it exerts on the body is inclined inwardly to the vertical. The container may be closed by two rigid end caps and be, in its unstressed state, tubular throughout its length except for the end caps.

When the container has a tubular portion, the axis of the tube may be curved and lie in a plane, one bearing surface lying inside the curve formed by the axis, and the other bearing surface lying outside the said curve. The said plane may be disposed vertically, the mounting device being arranged to provide support in a vertical and in a horizontal direction. Three or more mountings so arranged may support a body vertically and in all horizontal directions.

The invention also provides a rotary coupling which comprises a first rotatably mounted body, a second rotatably mounted body, the two bodies being mounted for rotation about a common axis, and a mounting device in accordance with the invention whose first member is rigidly connected to the first body and whose second member is rigidly connected to the second body, the arrangement being such that relative rotation between the bodies in one sense compresses the container. The rotary coupling transmits torque in this sense while at the same time lessening the transmission of variations in this torque in a corresponding manner to that in which the mounting transmits force.

The coupling may include a second mounting device in accordance with the invention whose first member is rigidly connected to the first body and whose second member is rigidly connected to the second body, the arrangement being such that relative rotation between the bodies in the sense contrary to the said sense compresses the container of the second mounting device. The coupling is then able to transmit torque in either sense. Couplings of this type can be made which accommodate not only relative angular movement between the two members, but also a certain amount of misalignment of their axes.

Preferably there are a plurality of mounting devices, the first body extends inside the second body and has a plurality of outward projections extending parallel to the common axis and equally spaced apart from one another in a circumferential direction, and the second body has an equal number of inward projections extending parallel to the common axis equally spaced apart from one another in a circumferential direction and each extending inwardly between a pair of the outward projections, each pair of adjacent inward and outward projections forming the first and second members of one of the said mounting devices, each container extending parallel to the common axis and being compressed in a circumferential direction, and the portion of each container which can come into contact with a bearing surface being tubular in its unstressed state.

The interior of each container may then be connected to the interior of an identical container situated diametrically opposite the first container at an equal distance from the common axis by conduit means having a low resistance to the flow of gas from one of the containers to the other, the two containers both being compressed by relative rotation between the two members in the same sense.

Four forms of mounting device and a rotary coupling all constructed in accordance with the invention will now be described in greater detail by way of example with reference to the accompanying drawings, in which.

Figure 1:
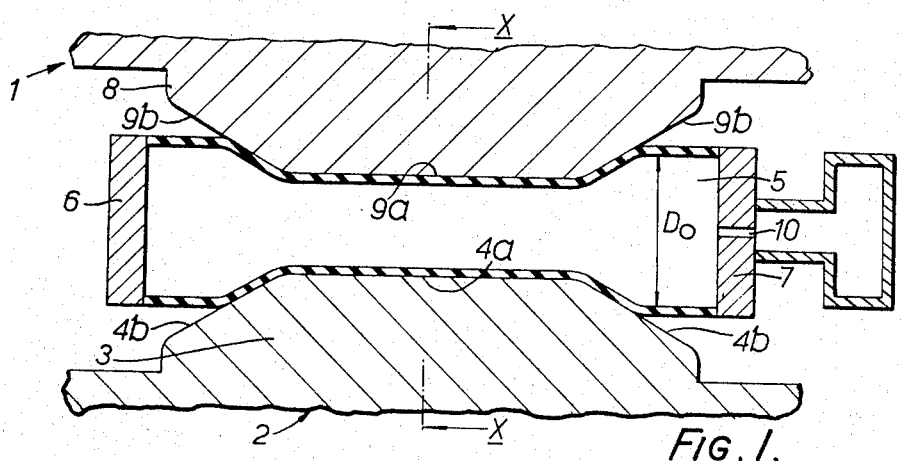
FIGURE 1 is an axial section through part of the first form of mounting device.
Figure 2:
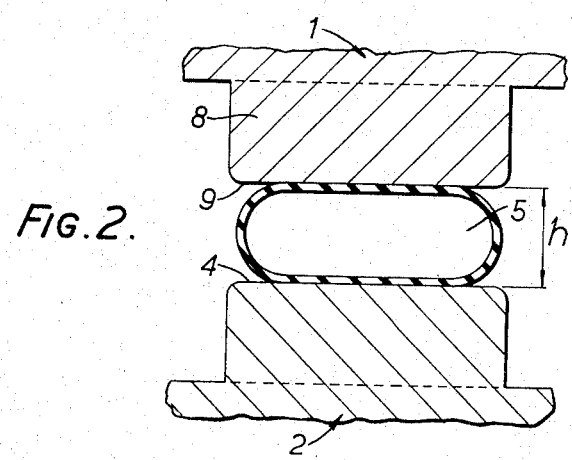
FIGURE 2 is a section on the line x—x of FIGURE 1.

Referring to FIGURES 1 and 2, the first form of mounting device supports a body indicated generally by the reference numeral 1 on a support indicated generally by the reference numeral 2. The support 2 has a projection 3 whose upper surface 4 consists of a planar horizontal centre portion 4a and two planar downwardly inclined end portions 4b. The surface 4 forms a bearing surface on which rests a container 5. The container 5 is formed from a tube constructed of flexible material. Fabric backed rubber is an example of a suitable material and in this case the material may be made substantially inextensible axially and radially although capable of accommodating limited bending of the tube. The backing may be composed, for example, of layers of fabric in which the threads run helically in opposite senses. The tube is closed at both ends by rigid circular end caps 6 and 7 to which it is sealed.

The body 1 has a projection 8 which has a lower surface 9 consisting of a planar horizontal centre portion 9a and two planar, upwardly inclined end portions 9b. The two surfaces 4 and 9 face one another and are symmetrical about the centre plane between them. The surface 9 forms a bearing surface which rests on the container 5.

One end cap 7 is formed with an orifice 10, which accommodates a nonreturn valve (not shown). The nonreturn valve permits the introduction of gas into the container 5.

In operation, the container 5 is filled with gas under pressure (the most convenient gas will usually be air) and the body 1 is supported by the pressure of the gas in the container. Any increase in the force to be supported by the container causes the bearing surface 9 to approach the bearing surface 4, decreasing the volume of the container and increasing the pressure of the gas. Also, the area of contact between the container and each of the bearing surfaces 4 and 9 increases. Thus, the total force exerted by the container on each of the bearing surfaces 4 and 9 increases. The amount of gas introduced into the container is such that the separation between the bearing surfaces 4 and 9 has a desired value when the body exerts its equilibrium force. A suitable value for this separation is a half of the diameter of the container itself when filled with gas under pressure but not subjected to any compressive force, and the pressure of the gas may then be 500 pounds per square inch gauge.

The force on the bearing surfaces 4 and 9 is substantially wholly due to the pressure of the gas, that is to say, any stiffness the material of the wall may have against flexion makes only a negligible contribution to the resilience of the mounting.

Figure 3:
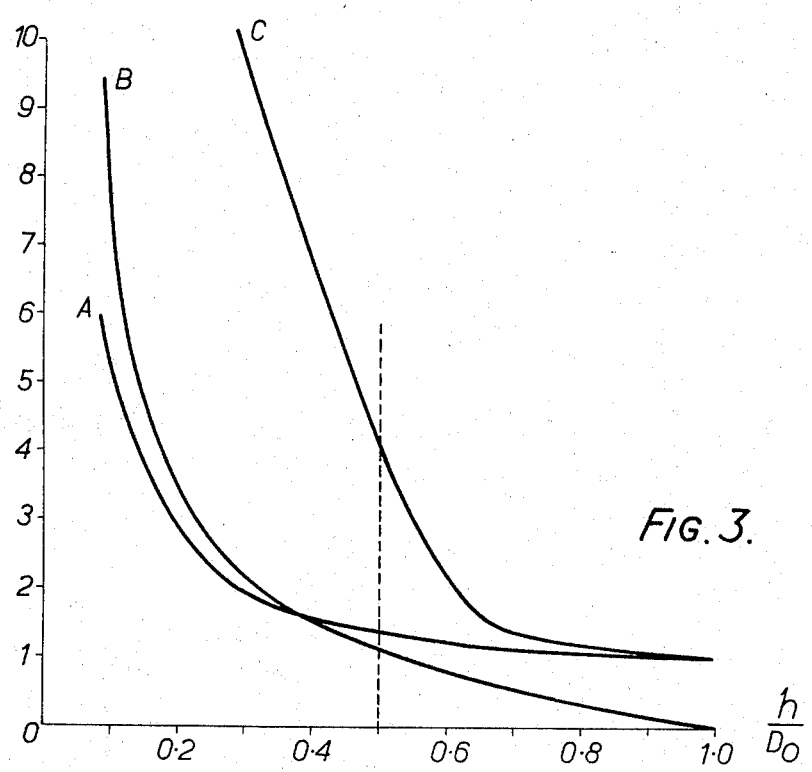
FIGURE 3 is a graph showing the variation of the characteristics of the first form of a mounting device as a function of the extent to which it is compressed.

FIGURE 3 shows the way in which various characteristics of the mounting vary as a function of the ratio $h/D_0$ of the separation $h$ between the centre portions 4a and 9a of the bearing surfaces to the diameter $D_0$ of the container 5 when it is in its uncompressed state. Curve A represents the pressure of the gas in the container. This approaches a constant value when $h/D_0$ approaches unity but rises to a high value as $h/D_0$ becomes small. Curve B represents the force exerted by the container on the body 1 and the support 2. This force is zero when $h/D_0$ is unity and the bearing surfaces 4 and 9 merely touch the container, and rises as $h/D_0$ becomes small at a faster rate than the pressure does. The force rises at a faster rate than the pressure because it is equal to the product of the pressure and the contact area, which also increases as $h/D_0$ decreases. Curve C represents the stiffness of the mounting, which is the magnitude of the slope of Curve B. As will be seen, this curve is sharply nonlinear.

The bearing surfaces 4 and 9 are flared outwardly at 4b and 9b to accommodate the end caps 6 and 7 and to avoid the need to have sharp edges bearing onto the container 5, which might thus be harmed.

Instead of the container 5 being sealed, its interior may be connected through the orifice 10 to a closed chamber having a constant volume at least one fifth the volume of the container 5 when it is in its uncompressed state (as as example of a suitable ratio, the volume of the chamber may be approximately one third this volume). The closed chamber is provided with means which enable gas to be introduced into the system under pressure and the system then to be sealed. When a force is applied to the body at the natural frequency of the system the motion of the body would tend to become very large, but the presence of the orifice introduces a damping which restricts the amplitude of the oscillation.

As an alternative, the container may form part of a constant-position mounting which tends to maintain a constant separation between the body and the support despite slow variations in the force applied to the body. The first form of mounting described in our British patent specification No. 27,827/63, when the pneumatic mount 1 of that mounting is replaced by the container 5 and projections 3 and 8 of this mounting, is an example of a suitable form of constant-position mounting.

Figure 4:
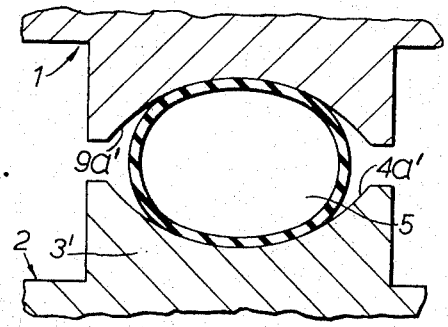
FIGURES 4 and 5 are transverse sections through the second and third forms of mounting device respectively.

Referring to FIGURE 4, the second form of mounting device is identical to the first except that the bearing surfaces 4' and 9' are each given a concave shape, both in the centre portions 4a' and 9a', which are cylindrical in the sense that they can be generated by the motion of a straight line parallel to itself, and in the end portions 4b' and 9b'. The effect of this curvature is to make the stiffness increase more sharply than is the case with a mounting having flat bearing surfaces and a container of the same uncompressed diameter.

Figure 5:
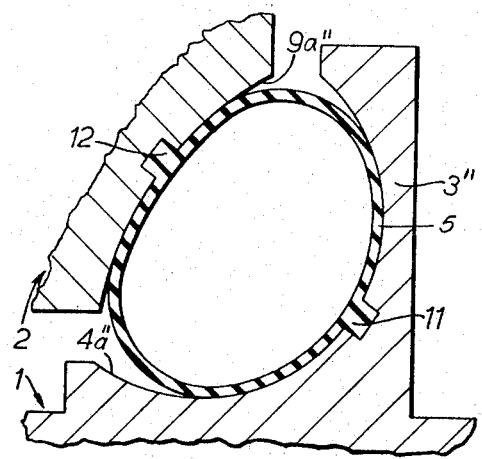

Referring to FIGURE 5 the third form of apparatus is basically similar to the second form. However, the bearing surface 9 is formed in one of the bottom edges of the body 1. The projection 3 is generally wedge-shaped, and its concave bearing surface 4a'' is formed along the length of the sloping face of the wedge. The direction of compression of the container 5 is at an acute angle to the vertical. The wall of the container 5 is formed with a projecting rib 11 which fits into a recess which runs along the centre of the bearing surface 4a''. A similar rib 12 fits into a recess running along the center of the bearing surface 9a''. The two ribs 11 and 12 locate the container with respect to the bearing surfaces 4a'' and 9a'', and prevent sideways slip between them.

The restoring force of this mounting is directed upwardly and inwardly. A second, similar, mounting may run along the opposite edge of the body. The two mountings together then provide vertical support and are able to accommodate a horizontal periodic disturbing force at right angles to the length of the mountings. A second pair of similar mounting devices may be placed along the two edges of right angles to the first pair, and the system then accommodates a disturbing force in any direction.

Figure 6:
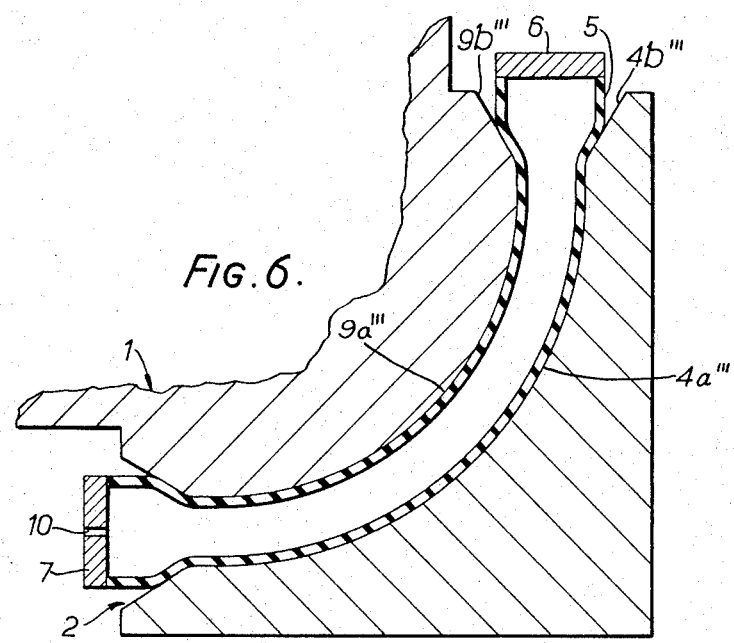
FIGURE 6 is an axial section through part of the fourth form of mounting device.

Referring to FIGURE 6, the fourth form of mounting device is situated at the corner of the mounted body. It has a container 5 which is formed as a curved tube whose longitudinal center line lies in a plane which is disposed vertically and which is arranged diagonally with respect to the body 1. The section of FIGURE 6 is taken in this plane. The bearing surface 4a''' lies outside the curve of the longitudinal center line and the bearing surface 9a''' lies inside it. The directions of the center line at the two ends of the curve are at right angles to each other, and the curve itself is generally circular. The bearing surfaces 4a''' and 9a''' have concave curvature in a direction transverse to the longitudinal center line of the container 5. Making the tube out of fabric backed rubber in which the threads of the fabric run helically in opposite senses and which can be deformed in the manner previously explained allows the tube itself to undergo the slight deformation necessary to accommodate it to the shape of the bearing surfaces.

The means for supplying gas under pressure to the interior of the container is the same as in the previous forms of mounting.

The mounting provides support vertically and horizontally in the plane of its axis. The body is supported by four mounting devices of this form, one at each corner, and the body is consequently supported vertically and against vibration in any horizontal direction.

Figure 7:
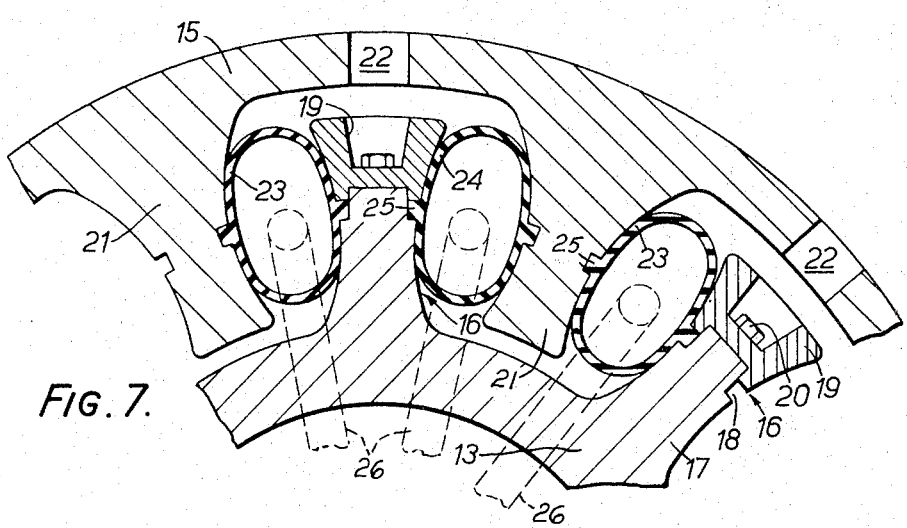
FIGURE 7 is an axial section through a part of the rotary coupling.

Referring to FIGURE 7, the rotary coupling comprises an inner generally cylindrical body 13 which is attached to a first shaft (not shown) which is coaxial with the body 13, and an outer generally cylindrical body 15 which surrounds the inner body 13. The outer body 15 is secured at one end (not shown) to a disc which is itself secured to a second shaft coaxial with the first shaft. The inner body 13 is formed with eight outwardly projecting ribs indicated generally by the reference numeral 16 which are evenly spaced around the circumference of the body 13 and extend parallel to the axis of the first shaft. Each rib 16 has a base portion 17 which is integral with the body 13 and which is formed, near its end face, with a shoulder 18 of each side face. An end-piece 19 is bolted by bolts 20 to the end face of the base portion 17 and has side walls which project towards the shoulders 18 to define between them a groove running along each side face of the rib 16. The outer body 15 has eight inwardly projecting ribs 21 which are evenly spaced about its circumference and extend parallel to its axis. Each rib 21 is formed with a groove running along each of its side faces. Each rib 16 projects between two ribs 21 and ends near the inner surface of the outer body 15; similarly each rib 21 projects between two ribs 16 and ends near the outer surface of the inner body 13. Apertures 22 in the outer body 15 situated between the ribs 21 provide access to the bolts 20. Between each pair of ribs 16 and 21 there is placed a container 23 or 24. The containers form two sets, one consisting of the containers 23 and the other of the containers 24, and movement of the inner member 13 relative to the outer member 15 compresses the containers 23 if it is an anti-clockwise direction (as seen in FIGURE 7) and the containers 24 if it is in a clockwise direction by a relative rotation between the two bodies in the opposite sense. Each of the containers 23 and 24 is similar to the container 5 of the second form of mounting device, and in its uncompressed state is a tube of flexible, substantially inextensible material. Each container 23 or 24 has two ribs 25 which fit into the grooves in the side faces of the two ribs 16 and 21 between which the container is situated to locate the container against sideways movement. The side face of the rib 16 with which the wall of the container 23 can come into contact forms a bearing surface and, similarly to the last three forms of mounting device, this bearing surface is curved, the curvature being concave.

The interior of each container 23 is connected by piping 26 to the container 23 which is diametrically opposite to it. The interior of each container 24 is similarly connected to the container 24 diametrically opposite to it. Each pair of connected containers 23 and 24 is connected by an orifice to a chamber having a volume at least a fifth of the total volume of the pair of containers in their uncompressed state and the piping (as an example of a suitable ratio, the volume of the chamber may be approximately one third this total volume).

In operation, the coupling transmits torque by compressing differentially the sets of containers 23 and 24 one set being compressed more than the other to cause a net torque to be transmitted in the corresponding sense. The torsional amplitude of vibration at the torsional resonant frequency is lessened in the same manner as in the second form of mounting device when it incorporates an additional chamber for damping purposes.

The coupling will normally be employed when one of the shafts connected to the bodies 13 and 15 rotates. It may, for example, be the transmission shaft from a combustion engine. The coupling then tends to isolate from the driven parts the variations in torque caused by the firing of the different cylinders. Conversely, it will tend to isolate the prime mover from periodic variations in the resisting force exerted by the driven parts.

The coupling can accommodate a certain amount of misalignment of the axes of the two bodies 13 and 15, to an extent governed by the clearance between the two bodies. In the case of misalignment in which the two axes are parallel to one another but slightly displaced, containers 23 or 24 lying generally in the plane containing the two axes are caused to roll slightly so that the two ribs 25 of each container are no longer opposite one another. However, of each connected pair of containers which lie generally perpendicularly to the plane containing the two axes, one is given an increase in compression and the other is given a decrease in compression. If the containers were not interconnected this would lead to a considerable variation in the force exerted by each container 23 or 24 on its bearing surfaces, but because they are the variation in the force exerted is reduced to a small amount mainly arising from the variation in contact area between the wall of the container and the bearing surfaces for the two containers. If the axes are skew, the containers can roll to an extent varying along their length.

The coupling is assembled before the end-piece 19 of each rib 16 is bolted to the base portion 17. The various parts are free to slide inside one another and are arranged in position with the containers 23 and 24 not subjected to a superatmospheric pressure. The end-pieces 19 are then bolted to their bases 17 and gas is introduced into the container. The diameters of the containers 23 and 24 and the pressures to which they are subjected are chosen to be such that in the operating conditions all the containers 23 and 24 are always subjected to a compressive force. That is to say, the containers 23 and 24 are never freed from their bearing surfaces.

I claim:

1. A rotary coupling which comprises a first rotatably mounted body having a bearing surface, a second rotatably mounted body having a bearing surface, the two bodies being mounted for rotation about a common axis, and a gas-filled resilient container interposed between the said two bearing surfaces, the resilience of the container being substantially wholly provided by the pressure of the gas it contains and the areas of contact between the said bearing surfaces and the container being variable in response to rotation of the said two bodies relative to one another.

2. A rotary coupling as claimed in claim 1, in which the first and second body each have a further bearing surface, and a second gas-filled resilient container is interposed between the said further bearing surfaces in contact therewith, the said second container being compressed by relative rotation of the two bodies in a sense opposite to that in which the first container is compressed, the resilience of the said second container being substantially wholly provided by the pressure of the gas it contains, and the areas of contact between the said further bearing surfaces and the said second container being variable in response to rotation of the said two bodies relative to one another.

3. A coupling as claimed in claim 1, in which the first body extends inside the second body and has a plurality of longitudinal projections projecting radially outward from the said first body, extending parallel to the common axis and equally spaced apart from one another in a circumferential direction, and the second body has an equal number of longitudinal projections projecting radially inward from the said second body, extending parallel to the common axis and equally spaced apart from one another in a circumferential direction, each of said projections projecting inwardly extends between a pair of the outward projections, each pair of adjacent inward and outward projections is provided with facing surfaces which surfaces form the said bearing surfaces, a tubular gas-filled container is interposed between each pair of said facing bearing surfaces in contact therewith, the resilience of each of said containers being substantially wholly provided by the pressure of the gas it contains and the areas of contact between each of said containers and the bearing surfaces between which it is interposed being variable in response to rotation of the said two bodies relative to one another.

4. A coupling as claimed in claim 3, in which there are provided a plurality of conduit means, each having a low resistance to the flow of gas and communicating with the interior of one container and with the interior of an identical container situated diametrically opposite the said one container at an equal distance from the common axis, the said two containers both being compressed by relative rotation between the two members in the same sense.

References Cited

UNITED STATES PATENTS

| | | |
|---|---|---|
| 1,634,895 | 7/1927 | Amory. |
| 2,076,071 | 4/1937 | De Bolt. |
| 2,115,158 | 4/1938 | Dupuy et al. |
| 3,073,621 | 1/1963 | Wedzinga. |
| 3,095,987 | 7/1963 | Sable. |
| 3,257,107 | 6/1966 | Nishioka et al. |

JOHN PETO, *Primary Examiner.*

UNITED STATES PATENT OFFICE
CERTIFICATE OF CORRECTION

Patent No. 3,371,894                           March 5, 1968

Michael Carl Hartnell-Beavis

It is certified that error appears in the above identified patent and that said Letters Patent are hereby corrected as shown below:

In the heading to the printed specification, line 4, "Yarrow and Company" should read -- Yarrow and Company Limited --.

Signed and sealed this 17th day of February 1970.

(SEAL)
Attest:

Edward M. Fletcher, Jr.
Attesting Officer

WILLIAM E. SCHUYLER, JR.
Commissioner of Patents